Patented Aug. 13, 1940

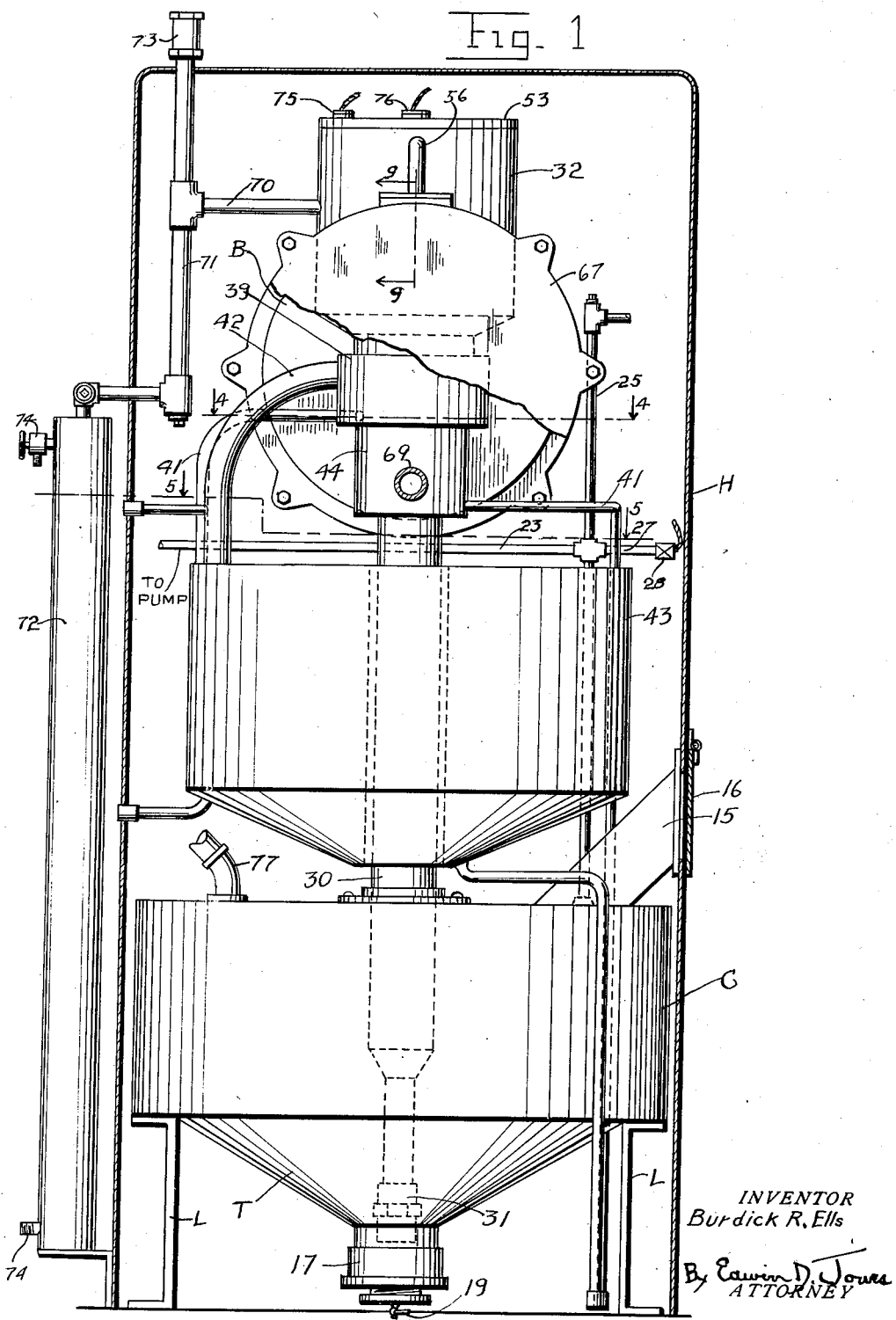

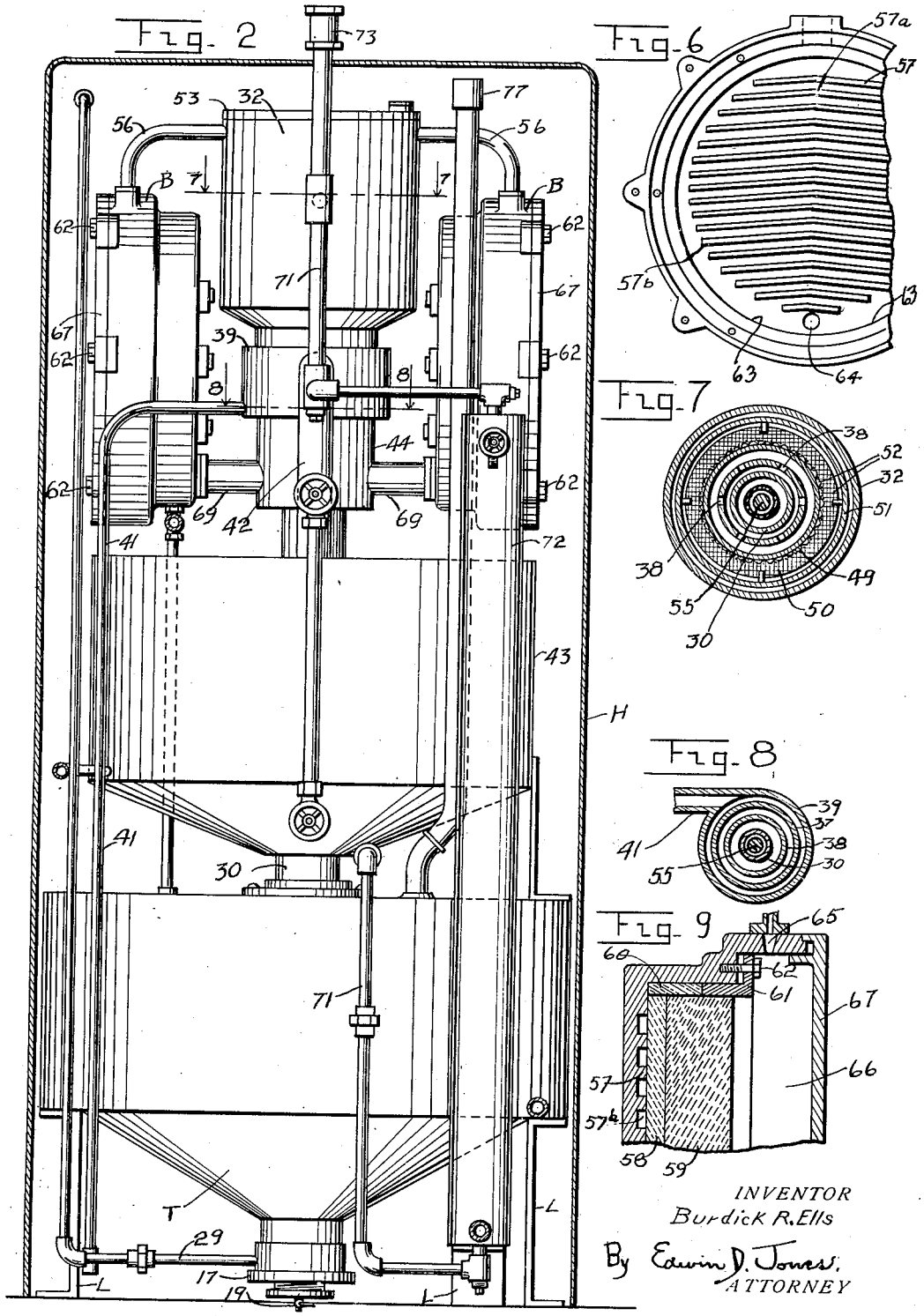

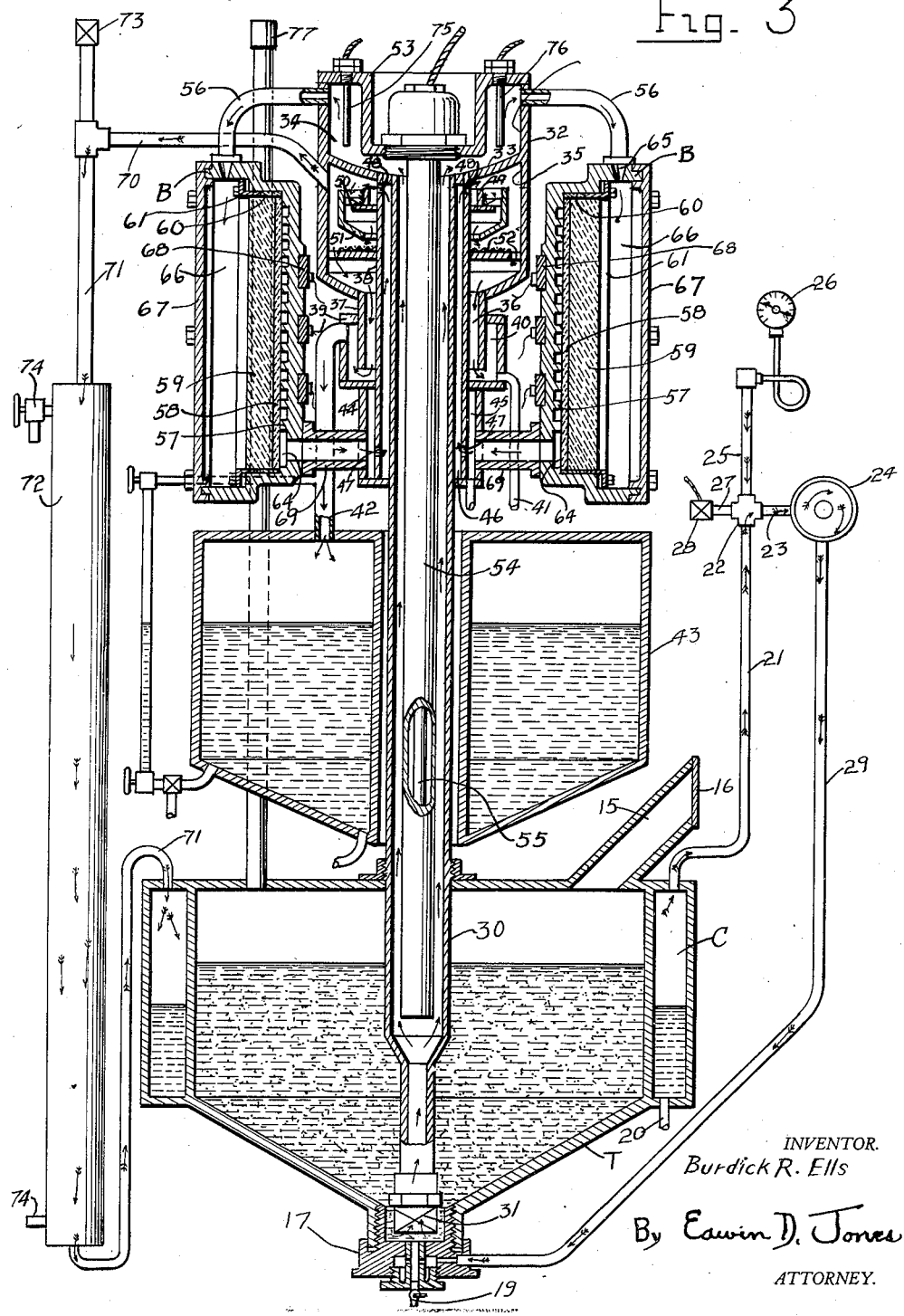

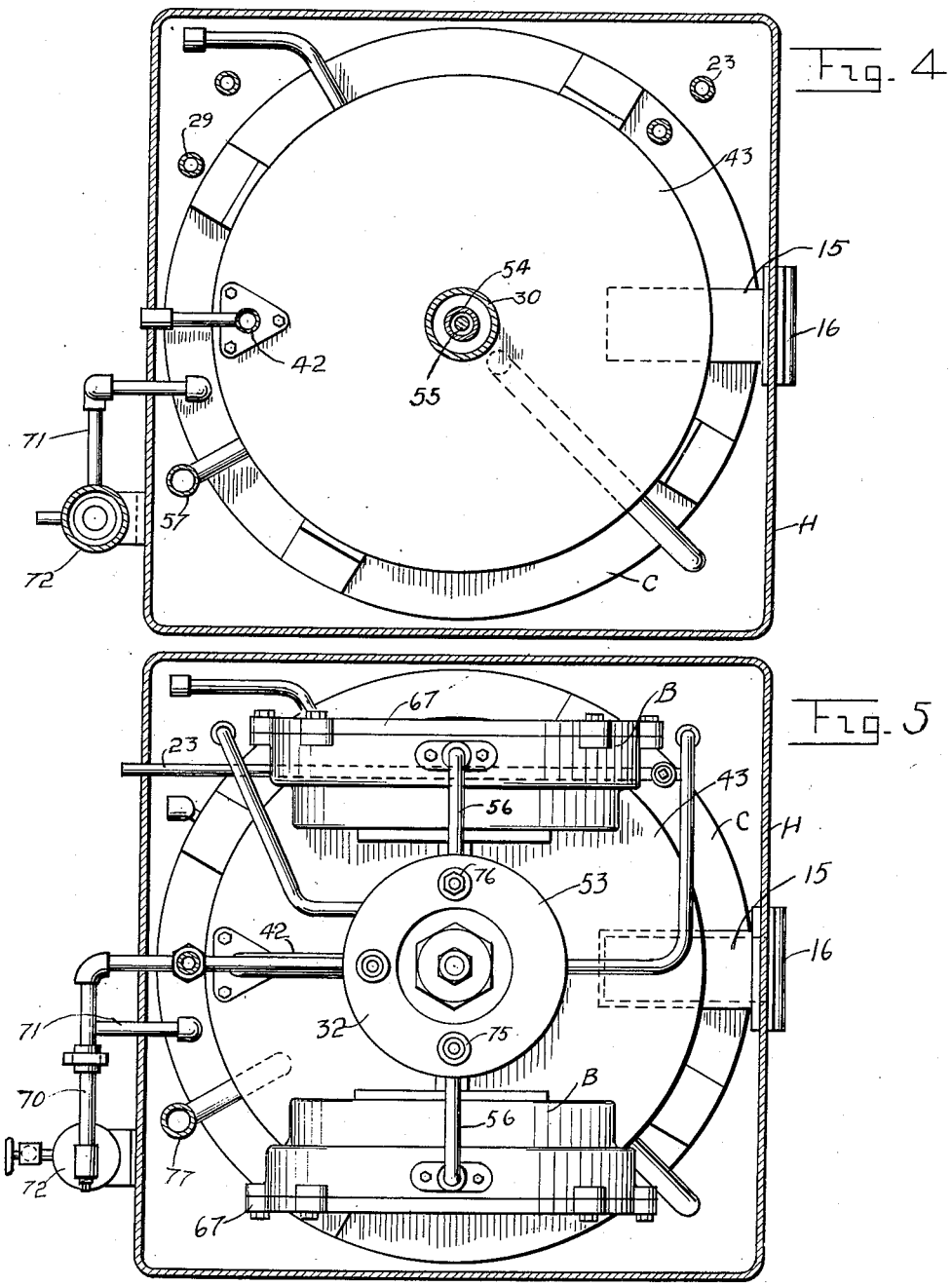

2,210,906

UNITED STATES PATENT OFFICE 2,210,906

OIL RECLAIMING APPARATUS

Burdick R. Ells, Los Angeles, Calif., assignor, by mesne assignments, to Harry F. Langlois and Herbert N. Langlois, Los Angeles, Calif., copartners doing business as Langlois Bros.

Application January 3, 1938, Serial No. 183,114

7 Claims. (Cl. 196—16)

My invention relates to apparatus of the character embodied in Patent No. 1,987,175, issued January 8, 1935, to V. C. Benjamin, such apparatus being designed for reclaiming small quantities of lubricating oil which have become contaminated and diluted by use in engines and the like, to remove therefrom volatile elements such as gasoline and water and particles of solid matter such as dust and carbon, all to the end of reclaiming the oil for reuse as a lubricant and recovering the valuable volatile elements therein.

Such apparatus as heretofore proposed are only partly effective for the purposes intended, because of their failure to maintain the oil throughout the process of treatment at a uniform refining temperature, thus allowing the volatile elements, when liberated as vapor, to recondense and to be thus reabsorbed by the oil, so that the final product is not devoid of all those volatile elements which reduce the lubricating quality of the oil.

It is a purpose of my invention to provide an oil reclaiming apparatus which is characterized by the provision of oil heating means, oil filtering means, and elements defining a course of circulation for the oil, in such relation to the oil heating and filtering means that an intimacy is established therebetween which initiates and maintains the oil at a substantially uniform refining or distillation temperature throughout the course of circulation, to permanently and completely release and separately collect all volatile elements and to filter all solid matter from the oil.

It is also a purpose of my invention to provide an oil reclaiming apparatus in which an oil trap is embodied to prevent the volatile elements from passing out with the filtered oil, so that the final product is devoid of any diluting elements.

A further purpose of my invention is the provision in an oil reclaiming apparatus, of an oil filtering means which effects, through a protracted and tortuous course in relation to a heating element, the complete filtering of the oil to remove all solid matter therefrom.

Another purpose of my invention is the provision in an oil reclaiming apparatus, of a labyrinthal chamber through which the oil is caused to flow in a manner to compel the oil to present a maximum surface area for the purpose of effecting the complete liberation of the volatile elements from the oil.

I will describe only one form of oil reclaiming apparatus embodying my invention and will then point out the novel features thereof in claims.

In the accompanying drawings:

Fig. 1 is a view showing in side elevation, with the housing thereof in section and a portion of one filter box broken away, one form of oil reclaiming apparatus embodying my invention.

Fig. 2 is a view showing the apparatus in rear elevation, with the housing thereof in section and certain pipes in section.

Fig. 3 is a semi-diagrammatic view with parts of the apparatus in vertical section and other parts in elevation.

Fig. 4 is a horizontal sectional view taken on the line 4—4 of Fig. 1.

Fig. 5 is a view similar to Fig. 4, taken on the line 5—5 of Fig. 1.

Fig. 6 is an enlarged detail view showing one of the filter boxes with the cover and filter blocks thereof removed.

Fig. 7 is an enlarged transverse sectional view taken on the line 7—7 of Fig. 2.

Fig. 8 is a transverse sectional view taken on the line 8—8 of Fig. 2.

Fig. 9 is an enlarged fragmentary sectional view of one of the filter boxes, taken on the line 9—9 of Fig. 1.

The apparatus comprises a suitable housing H, in which is contained a supply tank T, supported on legs L (Figs. 1 and 2). At its top the tank T is provided with a filling spout 15, which leads to an opening in the housing normally closed by a hinged door 16, the door being open only when a supply of used oil is delivered to the tank T through the spout 15.

As best shown in Fig. 3, the bottom of the tank T is of inverted conical form, and into its apex is threaded a foot plug 17, provided with a drain cock 19. The annular part of the tank T is double walled to form an annular tank C, in which condensate is adapted to be received. A drain pipe 20 is provided for the tank C at the bottom thereof, while at the top, the tank communicates with a pipe 21 extending to a T 22. In this T is connected a pipe 23 leading to a vacuum pump 24 of any conventional form and adapted to be operated in any suitable manner. Also extending into the T 22 is a pipe 25 to which is connected a vacuum gauge 26. Opposite the pipe 23 is a pipe 27 extending into the T 22 and provided with an electro-magnetically operated valve 28, adapted when opened to place the pump in communication with atmosphere and to thereby break the vacuum to admit air to the apparatus for a purpose to be described hereinafter.

From the discharge side of the pump 24 leads a pipe 29 to the foot plug 17, for the purpose of delivering air to the tank T, to agitate the oil therein, which oil is adapted to be mixed with a suitable comminuted clay employed for the purpose of decolorizing the oil.

Extending axially downward into the tank T is a conduit 30, its lower end extending into the foot plug 17, where it is provided with an inlet check valve 31. On the upper end of the conduit is a hollow body 32 having therein a partition 33 which divides the body internally into an upper chamber 34 and a lower separating chamber 35, with the conduit communicating with the chamber 34.

The lower end of the chamber 35 merges into an annular passage 36, formed between an annulus 37 and a tube 38, the latter extending upwardly into the body 32 with its upper end fixed to the partition 33. Secured to the annulus 37 and the tube 38 and surrounding the two is a box 39 which coacts with the annulus 37 to form an oil trap, the function of which will be later described herein.

The annulus 37 terminates short of the bottom of the box 39 so that the passage 36 communicates with an outlet chamber 40 formed by the box. A pipe 41 leads from the bottom of the box to permit drainage of oil from the box when and as required. An outlet pipe 42 communicates with the chamber 40 at the top thereof, and this pipe leads downwardly to the top of a receiving tank 43, adapted to receive the reclaimed oil. As shown in Figs. 1, 2 and 3, this tank 43 is disposed above the supply tank T and is formed with a central opening through which the conduit 30 extends.

Beneath the box 39 and concentric of the tube 38 is an annulus 44 to provide an intervening chamber 45. The tube 38 is concentrically spaced from the conduit 30 to form an intervening narrow and elongated chamber 46, which is in communication with the chamber 45 through inlet ports 47. The chamber 46 communicates with the separating chamber 35 through outlet ports 48. The combined area of the ports 47 is less than that of the ports 48, in order to regulate the flow of oil upwardly through the chamber 46 and into the chamber 35. This chamber 35 is of labyrinthal form in that it is provided with members by which the oil in its flow downwardly through the chamber, is caused to describe tortuous paths and, at the same time, to spread and present a maximum surface area to effect rapid and complete liberation of the volatile elements contained in the oil.

In the present instance, the labyrinthal chamber is formed by a collar 49 supported on a flat baffle 50, and arranged in relation to the ports 48 so that the oil leaving the ports passes over the collar and on to the baffle. Concentrically spaced from the baffle 50 is a funnel-shaped baffle 51 which receives the oil falling from the baffle 50 and directs it on to a relatively large baffle plate 52. This baffle plate 52 is spaced at its edge from the inner wall of the chamber 35 so that the oil can pass around the baffle downwardly through the passage 36 into the outlet chamber 40. The surfaces of the collar 49 and baffles 50 and 52 are covered with wire screening or similar material for the purpose of retarding the flow of oil thereover and spreading the oil to give greater surface area thereto, all to the end of promoting complete liberation of the volatile elements from the oil.

The chamber 34 is closed at its top by a cover 53, and depending from this cover is a tube 54 which extends downwardly into the conduit 30 and contains an electric heating element 55. Pipes 56, 56 lead from the chamber 34 adjacent the top thereof downwardly to filter boxes B, B for conducting oil from the chamber to the boxes. As the construction of the two boxes is identical, a description of one will suffice for both.

As best shown in Figs. 3, 6 and 9, each filter box has a back formed on its inner side with a multiplicity of ribs 57, against which is held a porous supporting disk 58, preferably formed of carborundum. Against this supporting disk is a filtering disk 59 of fine and relatively soft material designed to remove all solid matter from the contaminated oil. A packing ring 60 surrounds the disks 58 and 59, and a retaining ring 61 surrounds the disk 59 and is secured in position by screws 62 to secure the disk in fixed position within the box and to exert sufficent pressure on the packing ring to seal the joint between the box and the disks.

As best shown in Fig. 6, the ribs 57 are inclined in opposite directions from a point medially of their length, as indicated at 57ª, so as to define between adjacent ribs narrow channels 57ᵇ inclined in opposite directions toward the periphery of the box. However, the ribs terminate short of the inner box periphery in such a manner as to provide passages 63, increasing in width from the top of the box to the bottom thereof, in order to insure the free flow of oil from the box through an outlet 64 situated at the bottom of the box.

The pipe 56 leads to an inlet 65 at the top of the filter box (Fig. 9) for delivery of oil into a chamber 66 formed in the filter box between the filter disk 59 and a cover 67, removably secured to the box in any suitable manner. The outlet 64 communicates with a relatively large pipe 69 (Fig. 3) to afford communication with the chamber 45, whence the oil leaving the filter box enters the chamber 46 through the ports 47.

For the purpose of maintaining the oil delivered to the chamber 66 at a refining or distillation temerature and one which permits ready flow of the oil through the filter block and supporting plate, a plurality of electric heating elements 68 are provided. These elements are secured to the outer side of the back of the filter box so that the heat generated thereby is transmitted throughout the box and particularly to the ribs 57.

As best shown in Fig. 3 a pipe 70 affords communication between the separating chamber 35 and a vertical pipe 71, the latter extending at its lower end into a condenser 72, with its upper end provided with a relief valve 73. The condenser is of conventional form suitable to condense the vapors conducted thereto from the chamber 35, and connections 74 are shown by which water may be supplied to the condenser for converting the vapors into a condensate. The pipe 71 extends from the lower end of the condenser and then upwardly to communicate with the top of the tank C so that the condensate is ultimately delivered to the tank.

Thermostats 75 and 76 extend into the chamber 34 through the cover 53 to respectively control the supply of electrical current from a suitable source to the heating element 55 and the heating elements 68 of both filters. Also, the electrically operated valve 28 is adapted for manual control through a suitable switch to open or close the valve. The necessary electrical devices and circuits for the desired operation of the heating elements and valve form no part of the present invention and hence have not illustrated.

In the operation of the apparatus, a mixture of contaminated oil and clay is introduced through the spout 15 into the supply tank T. Pump 24 is started and the valve 28 opened. Air is thus drawn into the pump through pipes 27 and 23 and discharged through pipe 29 into the bottom of the tank T, thus agitating the oil and clay to effect a thorough intermixing of the two. This air is discharged from the tank T through a vent pipe 77. After thorough agitation of the mixture, the valve 28 is closed to produce a desired vacuum in the system as indicated by the gauge 26.

Thus the oil and clay mixture is drawn inwardly through the valve 31 and upwardly to fill the conduit 30 and the chamber 34. During this filling operation the heating element 55 remains deenergized, but immediately following the heating element is energized to heat the oil and clay mixture, and thus the apparatus is set into operation.

From the chamber 34, the mixture passes through the pipes 56 into the chambers 66 of the filter boxes, and thence through the filter disks 59 and the supporting disks 58. At this time the heating elements 68 are energized. In passing through the filter disks the clay and other solid matter, such as carbon and dirt, are removed from the oil. This filtration process is accelerated by the temperature to which the filtering disks is raised by the heating elements 68, to make the oil more fluid.

Upon the filtered oil reaching the ribs 57, its temperature is further raised due to its direct contact with the ribs and also by the function of the ribs to divide the oil into relatively small streams to give greater surface area thereto and retard the flow thereof, thus prolonging the time of contact of the oil with the ribs and box before it is finally discharged from the box.

From the preceding description, it will be clear that the heating elements 55 and 68 function to heat the oil in its circulation from the tank T to and through the filter boxes, so that when it enters the chamber 46 it is at a temperature to liberate the volatile elements. This oil temperature is maintained as the oil proceeds upwardly in the chamber 46 by virtue of the fact that the chamber surrounds the conduit 30, and thus the oil is again subjected to the heating action of the element 55. Thus as discharged from the ports 48 into the chamber 35 the volatile elements in vapor form are free to be given off the oil and to continue to be given off as the oil flows downwardly over the various baffles in the chamber.

Because of the encircling relation and close proximity of the chamber 35 to the heating element 55 there is no reduction in oil temperature as the oil flows downwardly, and thus there is eliminated any possibility of the vapors given off recondensing and recombining with the oil.

Under the vacuum produced in the system by the pump, the vapors in the chamber 35 are withdrawn into the pipe 70, circulated through the condenser 72 and finally discharged into the tank C as a distillate. The course of travel of the vapors and the resultant condensate is indicated in Fig. 3 by the arrows bearing tails, as distinguished from those arrows without tails employed to indicate the course of travel of the oil before and after reclaiming.

The oil, now devoid of the volatile elements, upon reaching the chamber 40 from the passage 36, accumulates therein to fill the chamber and the passage up to the level of the outlet pipe 42 before discharging through the outlet pipe. Thus a trap is formed by the oil which acts to seal the lower end of the separating chamber 35 to prevent any vapors discharging through the outlet pipe with the oil. Again, because of the high temperature of the oil maintained in the box 39 by reason of its proximity to the heating element 55, the vapors given off cannot cool and recondense at this point to recombine with the oil. Thus, in the final product, the oil as discharged in the tank 43 through the pipe 42 is completely refined for reuse as an effective lubricant.

It will be understood that the thermostats 75 and 76 function to deenergize the respective heating elements 55 and 68 when the oil exceeds in temperature that which is necesary to efficient refining.

A paramount feature of my invention is the advantage obtained in the apparatus of establishing and maintaining the oil throughout its course of travel, that is, from where it enters the conduit 30 until it is finally discharged from the pipe 42, at a refining or distillation temperature to insure the complete release in vapor form and permit the separate collection in liquid form of all oil diluting volatile elements. This is accomplished in my apparatus by virtue of the intimate association of the various chambers and passages with respect to the heating elements 55 and 68, such association also effecting maximum heat exchange to require only a minimum consumption of current.

Although I have herein shown and described only one form of oil reclaiming apparatus embodying my invention, it is to be understood that various changes and modifications may be made herein without departing from the spirit of my invention and the spirit and scope of the appended claims.

I claim:

1. In an oil reclaiming apparatus: a heating element; a conduit surrounding the heating element and through which used oil is adapted to travel to be heated by said element; an oil filter; a labyrinthal chamber closely surrounding the conduit and having an inlet at its top and an outlet at its bottom; pipes affording communication between the oil filter and the conduit for conducting heated oil from the conduit to the intake side of the oil filter; other pipes affording communication between the discharge side of the oil filter and the inlet of said chamber for conducting the filtered oil from the filter to the top of said chamber so that oil will flow downwardly of the chamber and give off its volatile elements during transit; and means for drawing off the volatile elements from said chamber.

2. In an oil reclaiming apparatus: a heating element; a conduit surrounding the heating element and through which used oil is adapted to travel to be heated by said element; an oil filter; a labyrinthal chamber closely surrounding the conduit and having an inlet at its top and an outlet at its bottom; pipes affording communication between the oil filter and the conduit for conducting heated oil from the conduit to the intake side of the oil filter; other pipes affording communication betwen the discharge side of the oil filter and the inlet of said chamber for conducting the filtered oil from the filter to the top of said chamber so that oil will flow downwardly of the chamber and give off its volatile elements during transit; means for drawing off the volatile elements from said chamber; an oil outlet pipe communicating with the outlet of the chamber; and a trap between the outlet pipe and the outlet for sealing the outlet against discharge of any vapors with the oil.

3. In an oil reclaiming apparatus as embodied in claim 1, wherein a plurality of baffles are provided in said chamber arranged one above the other and staggered vertically to cause oil entering the chamber through the inlet to describe a tortuous path in its flow to the outlet.

4. In an oil reclaiming apparatus as embodied in claim 1, wherein a plurality of baffles are provided in said chamber arranged one above the other and staggered vertically to cause oil entering the chamber through the inlet to describe a tortuous path in its flow to the outlet, and screening on the baffles arranged to retard and spread the oil in its passage over the baffles.

5. In an oil reclaiming apparatus: a heating element; a conduit surrounding the heating element and through which oil is adapted to travel to be heated by said element; an oil filter having its intake side communicating with the conduit; a tube surrounding the conduit and spaced therefrom to provide a narrow annular passage between the two; a pipe affording communication between the discharge side of said filter and the lower end of said passage; outlet ports in said tube at the upper end of said passage; a labyrinthal chamber surrounding said tube and communicating with said passage through the outlet ports; an oil discharge pipe communicating with the bottom of said chamber; means for drawing off vapors from said chamber; and means for causing oil to circulate through the conduit, filter and passage to be discharged to said chamber.

6. In an oil reclaiming apparatus as embodied in claim 5, wherein a trap is interposed between said chamber and said discharge pipe for sealing the pipe against the discharge of any vapors with the oil.

7. In an oil reclaiming apparatus: a heating element; a conduit surrounding the heating element; a tube surrounding the conduit and spaced therefrom to provide an intervening passage; a chamber surrounding the tube; an oil filter; pipes affording communication between the conduit and the intake side of the filter; inlet ports at the lower end of the tube affording communication between the discharge side of said filter and the lower end of said passage; outlet ports at the upper end of said tube affording communication between the upper end of said passage and the upper end of said chamber; the combined area of the inlet ports being less than that of the outlet ports for the purpose described; an oil receiving means communicating with the lower end of said chamber.

BURDICK R. ELLS.